United States Patent
Polinsky et al.

[19]

[11] Patent Number: 5,570,013
[45] Date of Patent: Oct. 29, 1996

[54] SPEED SENSOR ASSEMBLY HAVING A FLUID SEAL CARRIER AND PILOTING CUP

[75] Inventors: Mark A. Polinsky, Torrington; John M. Grillo, Plymouth; Scott M. Duncan, Avon, all of Conn.

[73] Assignee: The Torrington Company, Torrington, Conn.

[21] Appl. No.: 31,515

[22] Filed: Mar. 15, 1993

[51] Int. Cl.⁶ .............. G01P 3/487; G01P 3/488; F16C 32/00; G01B 7/14
[52] U.S. Cl. .................. 324/174; 324/207.25
[58] Field of Search .............. 340/670; 324/173, 324/174, 207.25; 384/448

[56] References Cited

U.S. PATENT DOCUMENTS

| 3,619,680 | 11/1971 | Okamoto | 310/168 |
|---|---|---|---|
| 3,719,841 | 3/1973 | Ritsema | 310/155 |
| 3,999,441 | 12/1976 | Gonzales | 73/518 |
| 4,246,790 | 1/1981 | Nichols | 73/493 |
| 4,504,756 | 3/1985 | Amano et al. | 310/168 |
| 4,940,936 | 7/1990 | Grillo et al. | 324/174 |
| 4,988,220 | 1/1991 | Christiansen et al. | 384/448 |
| 5,264,790 | 11/1993 | Moretti et al. | 324/174 |
| 5,293,124 | 3/1994 | Caillaut et al. | 324/174 |

FOREIGN PATENT DOCUMENTS

| 0 394 083 A1 | 10/1990 | European Pat. Off. |
| 38 09 904 A1 | 10/1989 | Germany. |

Primary Examiner—Walter E. Snow
Attorney, Agent, or Firm—John C. Bigler

[57] ABSTRACT

A fluid seal is joined to a seal carrier, and a magneto-responsive sensor is coupled to a carrier to sense the polarities of a magnet borne on a rotatable shaft. The seal carrier, with the incorporated sensor, is arranged about the shaft, and leads from the sensor transmit an output signal voltage which corresponds to, or is proportional to the speed of rotation of the shaft. Depending upon the type of sensor employed, the signal voltage will be of repeatedly changing amplitude (i.e., pulsed or sine wave), or of given amplitude, in which the signal goes from zero to the given amplitude, to zero cyclically, or the sine wave amplitude/voltage increases with increasing speed, or pulse widths which diminish with speed acceleration.

7 Claims, 7 Drawing Sheets

5,570,013

SPEED SENSOR ASSEMBLY HAVING A FLUID SEAL CARRIER AND PILOTING CUP

BACKGROUND OF THE INVENTION

This invention pertains to means for detecting the wheel speed of a vehicle by producing a voltage corresponding to, or proportional to the speed, or a series of on and off pulses at a voltage chosen by the customer, and in particular to a speed sensor which is incorporated with a fluid seal, such as the output seal on the transmission case of a vehicle, into an assembly of both the seal and the sensor.

Known speed sensors, in front wheel drive automobiles, are typically located at the wheel ends of the axle. The standard sensor is a variable reluctance type that senses a tone wheel or gear tooth pressed onto the shaft. In order to assure the accuracy of this type of sensor, the shaft must be machined specially to adhere to specifications of the axle manufacturers. Also, the known sensor systems require adjustment, after installation, to insure an air gap in the operating range of the sensor. Further, heat from the brakes can push the sensor beyond the upper limits of its safe operating range.

The foregoing illustrates limitations known to exist in present speed sensing devices. Thus, it is apparent that it would be advantageous to provide alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a fluid seal and speed sensor assembly comprising a seal carrier; a seal joined to the carrier; and a magneto-responsive sensor coupled to the carrier.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
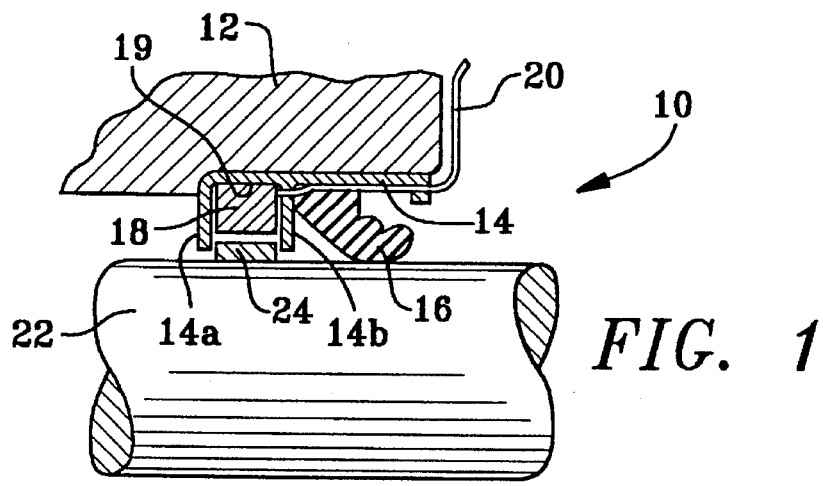
FIGS. 1 and 2 illustrate an embodiment of the speed sensor within the seal carrier, sensing an encoder on and rotating with the output shaft of a vehicle transmission, the sensor and seal assembly being set within the transmission housing.

In a first embodiment of the invention, a seal and speed sensor assembly 10, FIG. 1, is set in the transmission housing 12 of a vehicle. A circular band 14 comprises a carrier for the shaft seal 16, and for the speed sensor 18. Band 14 has a pair of parallel walls 14a and 14b which, therebetween, define a recess 19. The speed sensor 18 is supportingly carried by the band 14, and it occupies the recess 19. The latter, by way of example, comprises a Hall effect device which, via lead 20, provides a pulsed on/off-type of output signal for an analog converter (not shown). Optionally, other sensors, such as a variable reluctance device for producing a sine wave voltage of increasing amplitude with increasing speed, can be employed, or devices productive of pulses of uniform voltage/amplitude albeit of diminishing width with increasing speed. The shaft 22, about which the assembly 10 is disposed, carries a north- and south-polarized magnet 24, to trigger the sensor 18, according to a practice well known in the art. The magnet 24 comprises an elasto-ferrite material which is flexible and bondable to steel.

Figure 2:
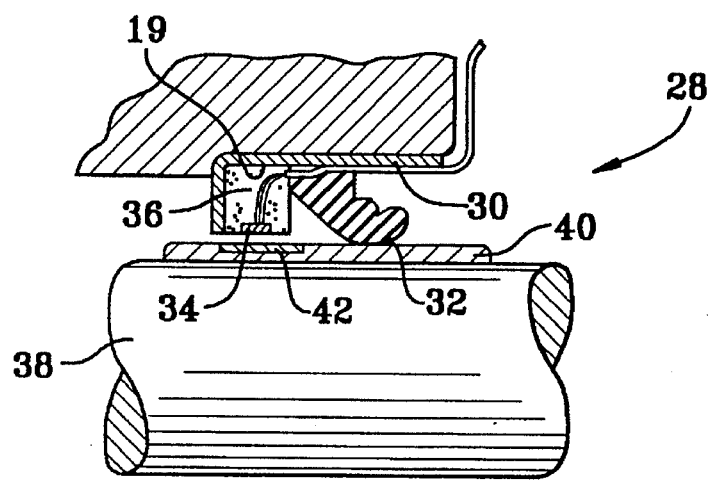

In FIG. 2, the seal and speed sensor assembly 28 has a similar, dished, circular band 30 for carrying the shaft seal 32 and the speed sensor 34. The latter is encapsulated in an epoxy 36 which is adhered to the band 30 and occupies the recess 19. Here, the shaft 38 has a hardened sleeve 40 thereon in which is embedded the north- and south-polarized magnet 42. Magnet 42 comprises a magnet piece with alternating north and south poles placed onto it by a magnetizing fixture.

Figure 3:
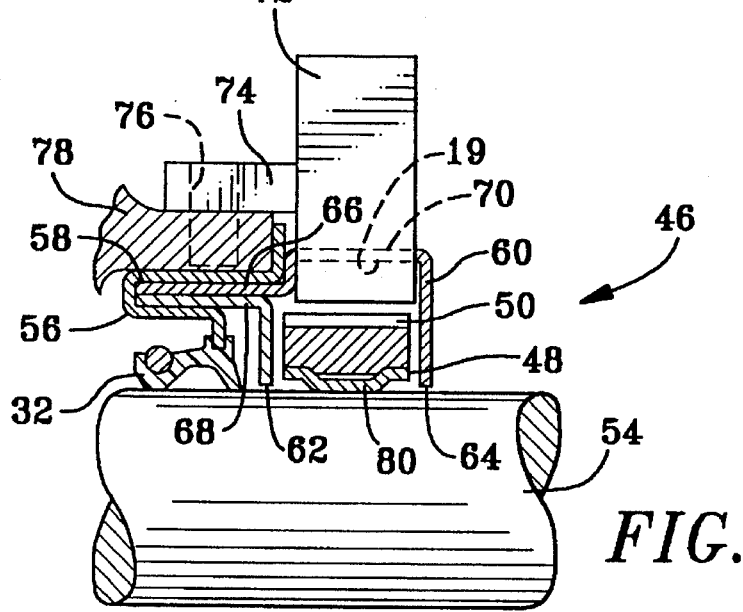
FIG. 3 is a cross-sectional view illustrating an alternative embodiment of the invention, in which an encoder ring is employed together with a piloting cup.

An embodiment of the invention 46, shown in FIG. 3, employs an encoder ring 48 for encoding the shaft 54, and a piloting cup 60 within which to confine the ring 48. The ring 48 carries, on the outer circumference thereof, the north- and south-polarized magnet 50. The ring 48 is pressed onto the shaft 54, for frictional engagement therewith and rotation in common with the shaft 54. The seal carrier 56 has an annular channel 58 formed therein. Piloting cup 60 has a pair of radial walls 62 and 64 which are astride the ring 48 and which forms the recess 19, and a pair of extending, cylindrical and parallel walls 66 and 68. Walls 66 and 68 are press-fit within the channel 58.

The piloting cup 60 has a void 70 formed therein to accommodate therethrough a sensor probe 72 for intrusion of the probe 72 into the recess 19. The probe 72 has a limb 74 extending therefrom with a fastener-accommodating aperture 76 formed therein for fastening the assembly embodiment 46 to the transmission case 78. Unlike prior art arrangements, in which annular housings, such as piloting cup 60, must accommodate therewithin a wheel bearing, piloting cup 60 comprises means for only supporting the seal carrier 56, for supporting the sensor probe 72, and pilotingly orienting thereof about, and radially aligning thereof with, the encoder ring 48. Accordingly, the piloting cup need not be associated with any bearing or other such structure or component, other than the shaft 54, and some immobile, reference structure such as transmission case 78.

Figure 4:
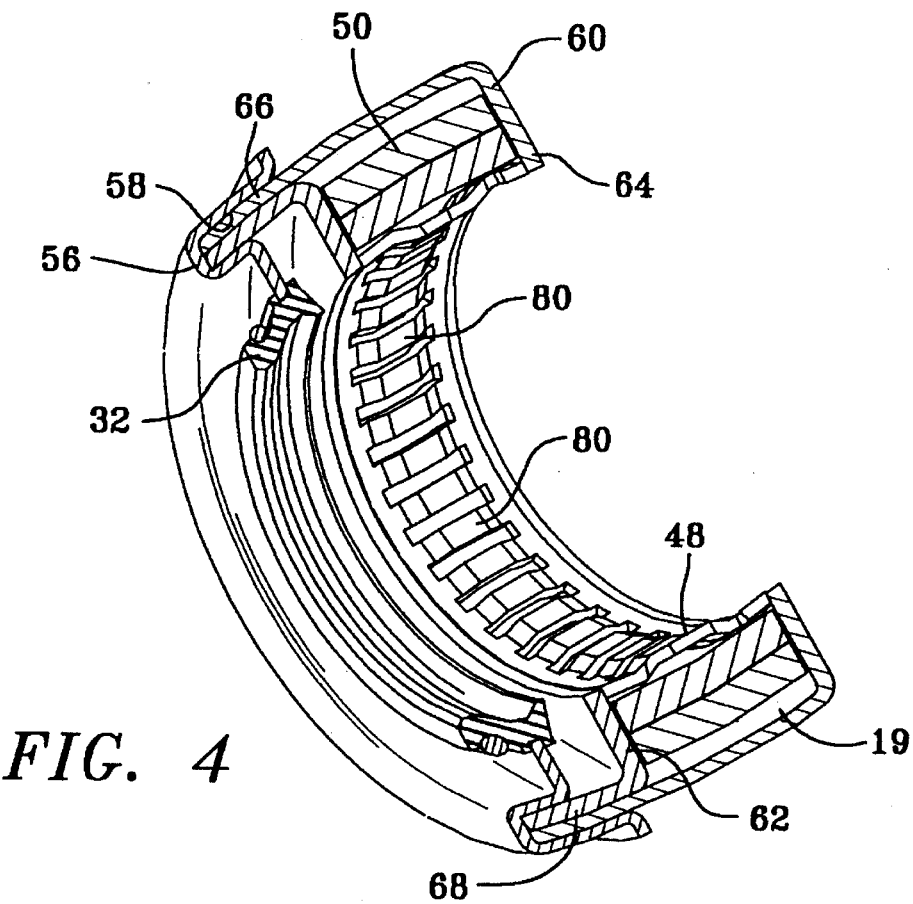
FIG. 4 is a perspective view of half of the encoder ring of FIG. 3.
Figure 5:
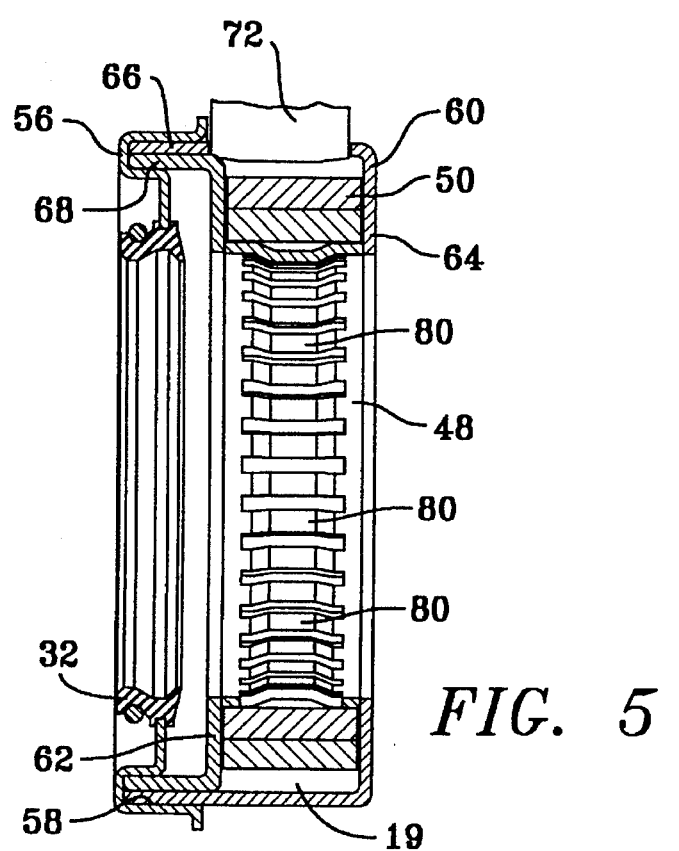
FIG. 5 is a plan view of the ring half of FIG. 4, and including a portion of a sensor probe in penetration of the piloting cup.

FIG. 4 shows, in perspective, a half of the encoder ring 48 of FIG. 3. It has a plurality of ribs 80 bridging thereacross which clasp the shaft for effecting common rotation therewith. FIG. 5 shows a plan view of the encoder ring half of FIG. 4. Both figures depict the arrangement of the seal carrier 56 and the piloting cup 60 in association with the shaft-carried encoder ring 48. A portion of the sensor probe 72 is shown in penetration of the piloting cup 60 in FIG. 5.

Figure 6:
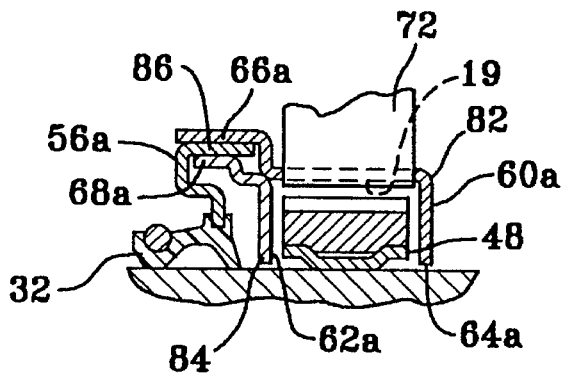
FIG. 6 through 22 depict cross-sectional views of alternative embodiments of the invention, the illustrations corresponding, generally, to that of FIG. 3.
Figure 7:
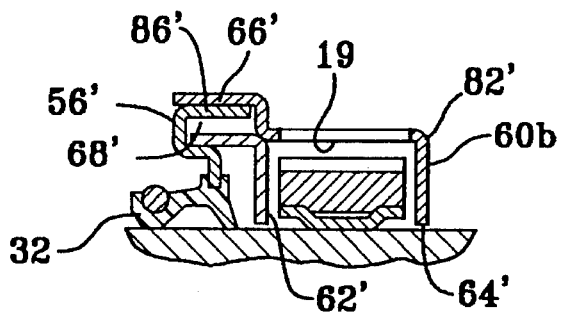
Figure 8:
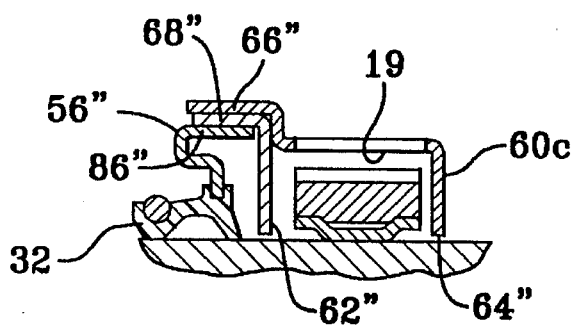

FIGS. 6, 7 and 8 depict embodiments of the invention in which the piloting cups 60a, 60b and 60c, respectively, comprise dual elements. Elements 82 and 84, of cup 60a in FIG. 6, have radial walls 62a and 64a which confine the ring 48 there-between. The elements 82 and 84 further have cylindrical walls 66a and 68a. The seal carrier 56a also has a cylindrical wall 86 which is frictionally engaged with, and set between, the walls 66*a* and 68*a*.

In FIGS. 7 and 8, arrangements very similar to that shown in FIG. 6 are depicted, and same or similar index numbers, as shown in FIG. 6, denote same or similar structures.

Figure 9:
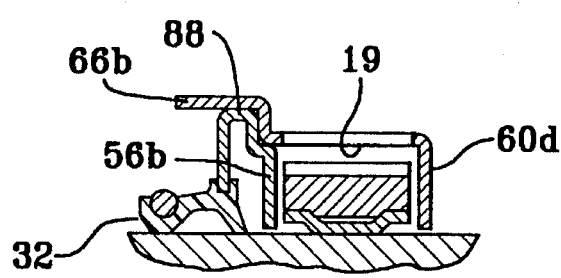
Figure 10:
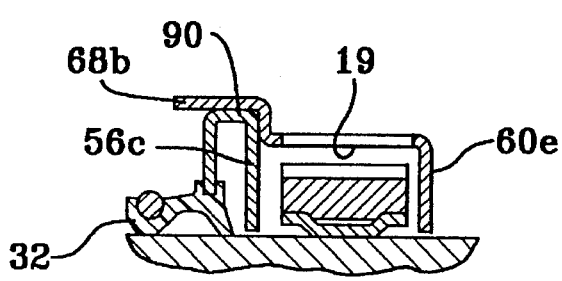

FIGS. 9 and 10 show further embodiments of the invention in which the piloting cups 60*d* and 60*e*, respectively, are single-element structures. Each thereof has a cylindrical wall 66*b* and 68*b*, respectively. The seal carriers 56*b* and 56*c*, respectively, have bends 88 and 90, respectively, which are frictionally engaged with the aforesaid, respective cylindrical walls 66*b* and 68*b*.

Figure 11:
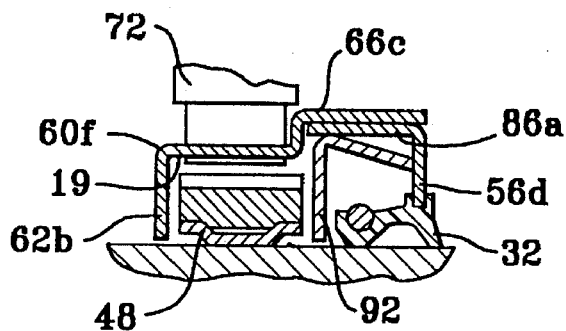
Figure 12:
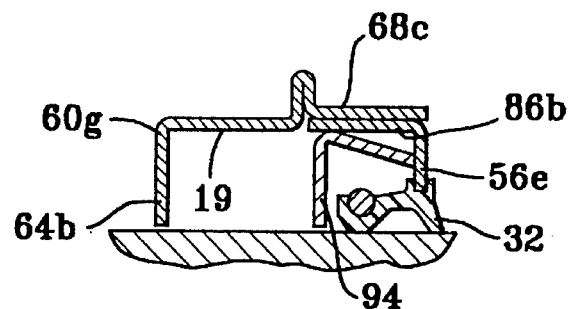

In FIGS. 11 and 12, more embodiments of the invention are illustrated in which the piloting cups 60*f* and 60*g*, respectively, each have a radial wall 62*b* and 64*b*, respectively, for piloting the encoder ring 48, and a cylindrical wall 66*c* and 68*c*, respectively, for frictionally receiving thereagainst a cylindrical wall 86*a* and 86*b*, respectively, of the seal carriers 56*d* and 56*e*. In addition, a radially-walled element 92 and 94, respectively, is interposed between the carriers 56*d* and 56*e* and the ring 48.

Figure 13:
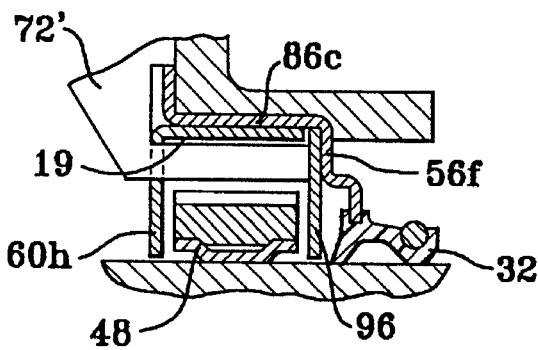
Figure 14:
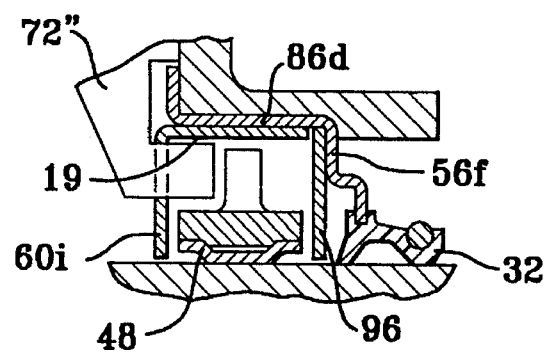
Figure 15:
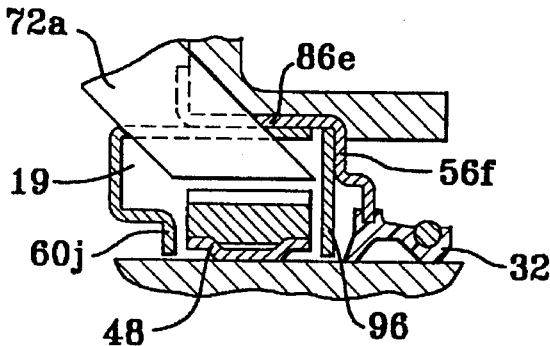

The embodiments of the invention depicted in FIGS. 13, 14 and 15 employ washers to assist in piloting the encoder ring 48. In each of these arrangements, a single element piloting cup 60*h*, 60*i* and 60*j*, respectively, is pressed into engagement with cylindrical walls 86*c*, 86*d* and 86*e*, respectively, of the seal carriers 56*f*. The washers 96 are interposed between the carriers and the ring 48.

Figure 16:
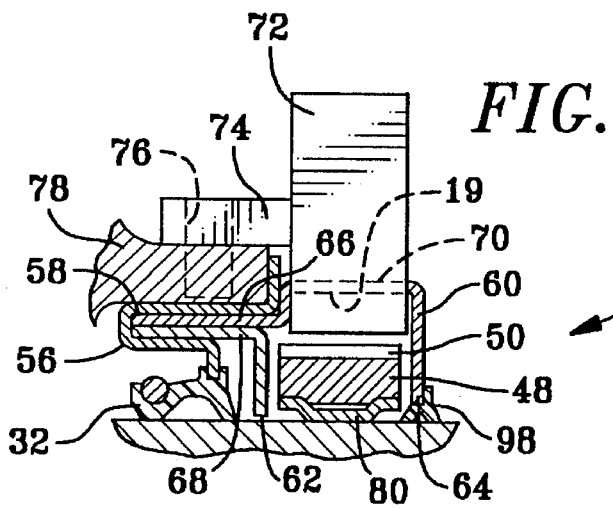
Figure 17:
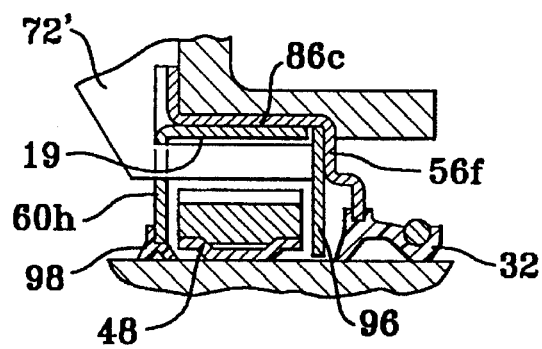

FIGS. 16 and 17 depict embodiments of the invention which correspond to the embodiments of FIGS. 3 and 13, respectively. However, herein a further seal 98 is joined to a radial wall of the piloting cup 60 and 60*h*, respectively. The seal 98 is used as a lead in device which serves to hold the encoder ring 48 in place during installation.

Figure 18:
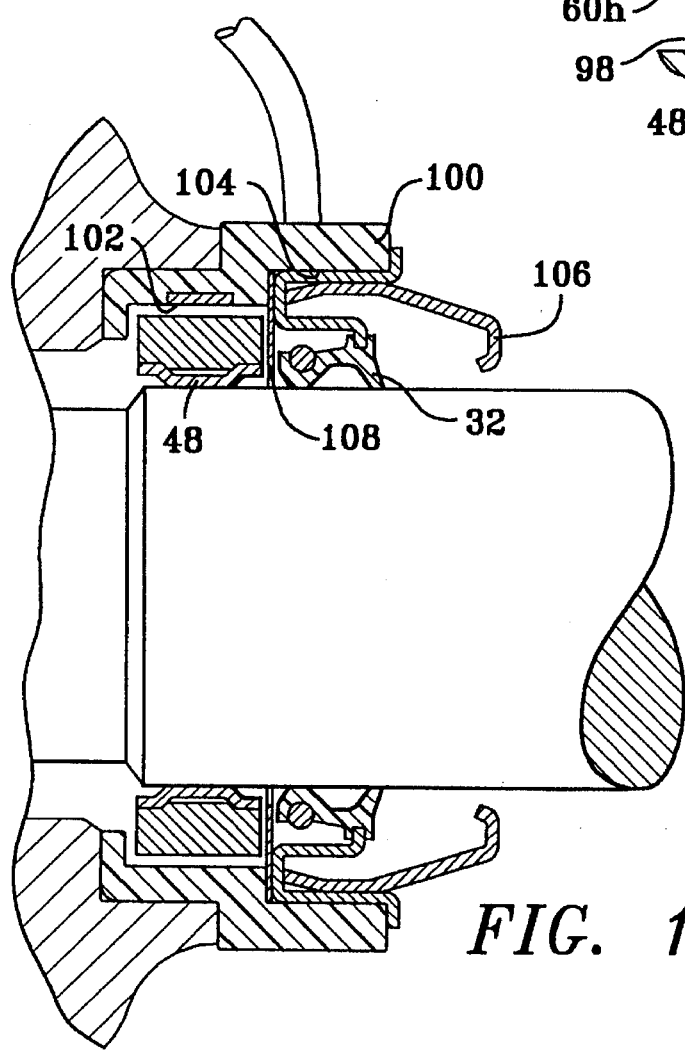

FIG. 18 shows yet another embodiment of the invention in which the sensor comprises an annulus 100 which has stepped recesses 102 and 104 therein. The encoder ring 48 is set in recess 102 and the seal carrier 106 is set into the other recess 104. A washer 108 is interposed between the carrier 106 and the ring 48 to cooperate with recess 102 for piloting the ring 48.

Figure 19:
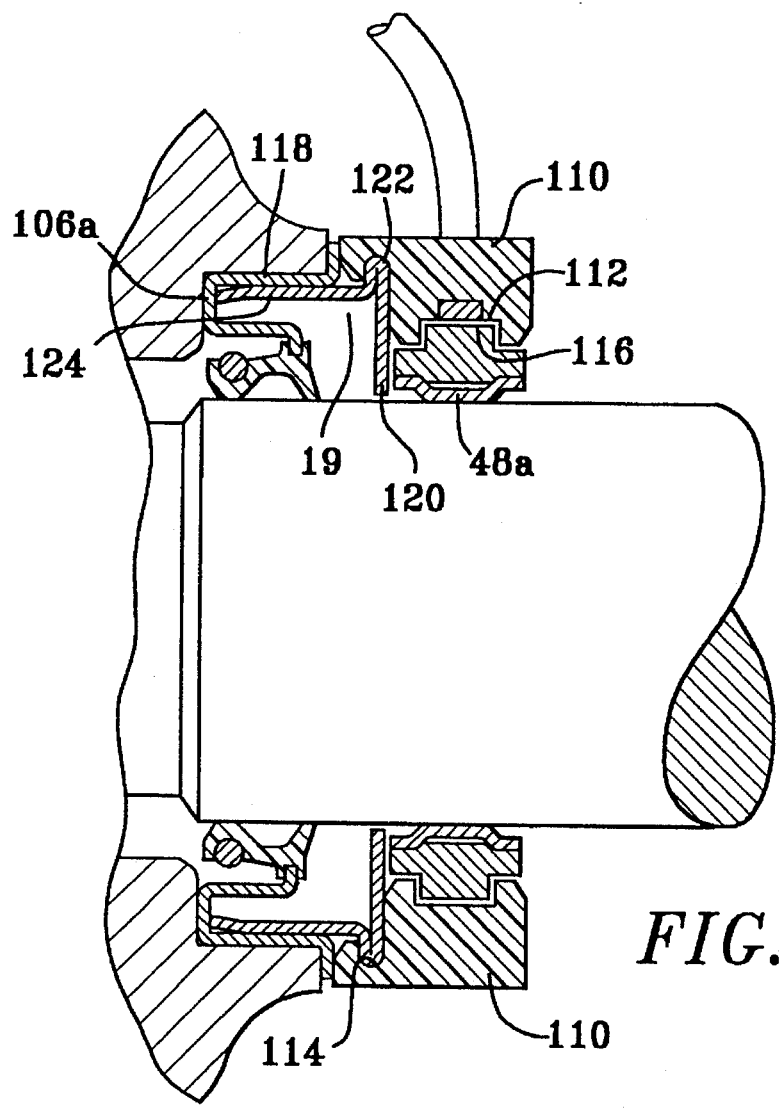

A variation of the FIG. 8 embodiment of the invention is depicted in FIG. 19 where, again, the sensor comprises an annulus 110 which has an annular channel 112 formed therein and an annular groove 114. The encoder ring 48*a* has an annular rib 116 formed thereon which effects a snap-action engagement thereof the channel 112. The seal carrier 106*a* has a cylindrical wall 118, and a single element piloting cup 120 has a bend 122 which effects a same snap-action engagement thereof with the groove 114. Also, the cup 120 has a cylindrical wall 124 which is frictionally engaged with the wall 118 of the seal carrier 106*a*.

Figure 20:
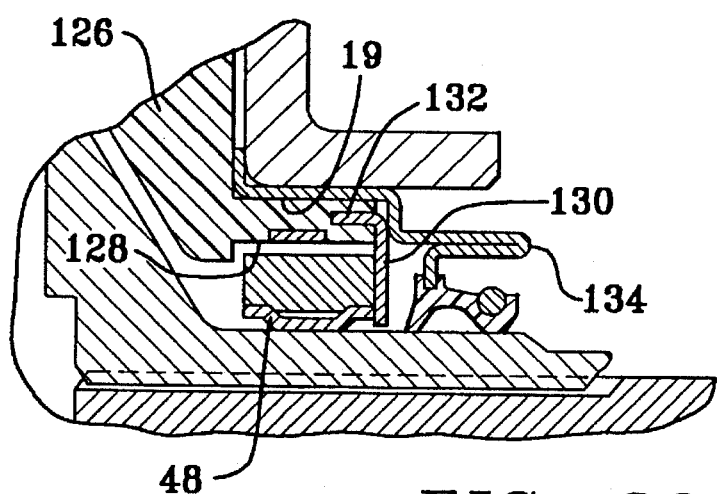

FIG. 20 illustrates another embodiment of the invention in which the sensor, again, comprises an annulus 126 which has a recess 128 formed therein. The encoder ring 48 is set in the recess 128, and a single element piloting cup 130 is set against the ring 48 and engaged with a cylindrical slot 132 formed in an outermost surface of the annulus 126. The seal carrier 134 is set into an end of the annulus 126 and against the cup 130. As shown, the whole assembly can be bolted to the outside of the transmission.

Figure 21:
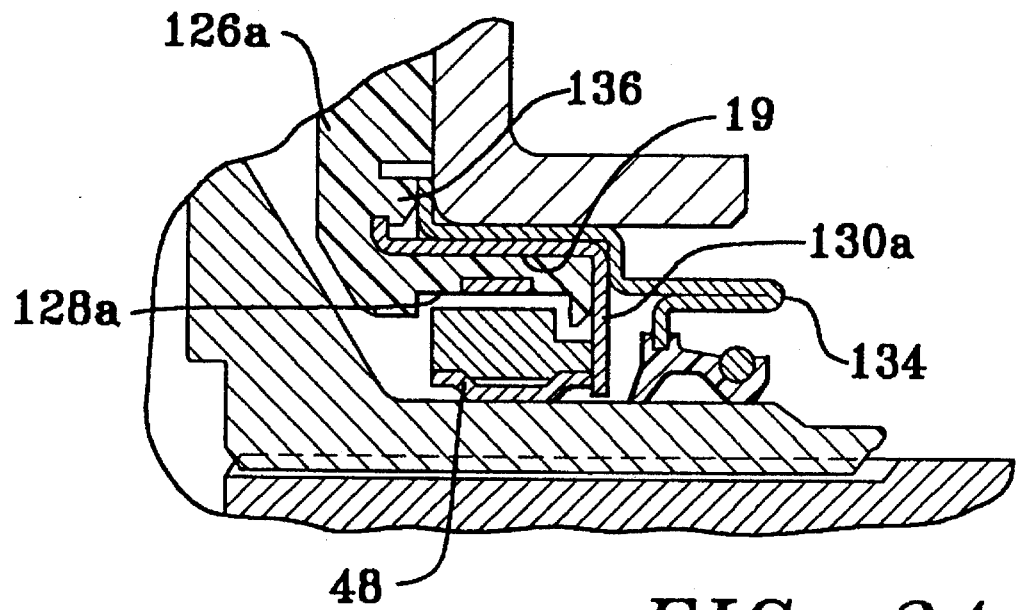

In FIG. 21 is shown an arrangement similar to that of the FIG. 20 embodiment, except that the annulus 126*a* has a deeper recess 128*a* for the encoder ring 48, and the piloting cup 130*a* has an outermost lip thereof received in a radial groove 136 formed in the annulus 126*a*. This arrangement allows the annulus 126*a* to be snapped into place onto the piloting cup 130*a*, for ease of assembly and disassembly.

Figure 22:
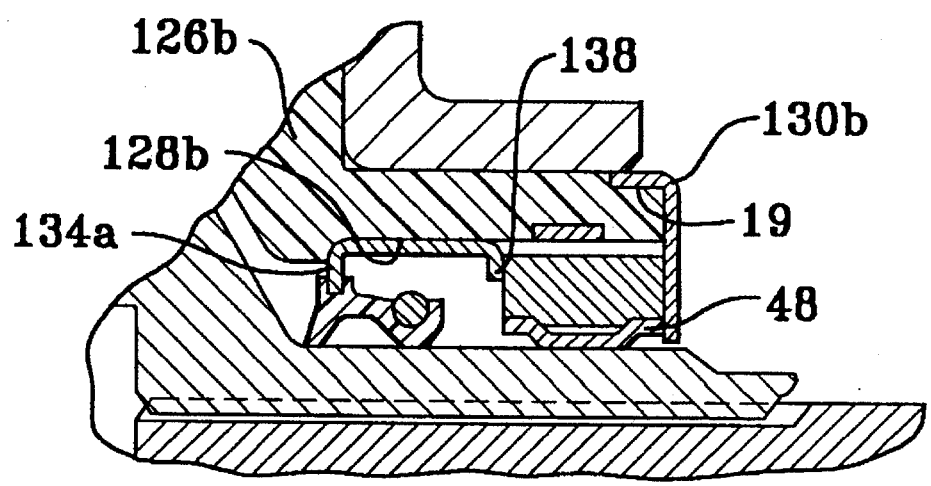

In another, last embodiment of the invention, illustrated in FIG. 22, the annulus 126*b* has a stepped recess 128*b* formed therein. The seal carrier 134*a* is set within a first portion of the recess, and has a radial lip 138 disposed for confronting the encoder ring 48. The ring 48 is set within the second, remaining portion of the recess 128*b*. A piloting cup 130*b* is set alongside of the ring 48 and engaged with an end of the sensor annulus 126*b*.

While we have described our invention in connection with specific embodiments thereof, it is to be clearly understood that this is done only by way of example, and not as a limitation of the scope of the invention as set forth in the summary thereof, and in the appended claims.

Having described the invention, what is claimed is:

1. A fluid seal and speed sensor assembly, comprising:

an encoder ring for frictional engagement with the cylindrical, external surface of a rotary shaft for rotation thereof with said rotary shaft;

a magneto-responsive sensor;

a seal carrier;

a seal joined to said carrier, and; wherein said seal is disposed for engagement with said external surface of said shaft; said seal is in juxtaposition with said ring; and structural means only having (a) a given structure for supporting said seal carrier thereon, and (b) a different structure for supporting said sensor therein, separably from said seal carrier, and for pilotingly orienting thereof about, and radially aligning thereof with, said encoder ring; wherein said structural means comprises a piloting cup; and said piloting cup and said seal carrier are only frictionally joined together.

2. A fluid seal and speed sensor assembly, according to claim 1, wherein:

said carrier has an annular channel formed therein;

said cup has a pair of extending, cylindrical parallel walls; and said walls are frictionally set within said channel.

3. A fluid seal and speed sensor assembly, according to claim 1, wherein:

said sensor has a limb extending therefrom; and said limb has a fastener-accommodating aperture formed therein for removable fastening of said assembly to an immobile structure.

4. A fluid seal and speed sensor assembly, according to claim 1, wherein:

said piloting cup has a radial wall;

said carrier has a radial wall; and said walls are spaced apart and confine said encoder ring therebetween; wherein said cup further has a cylindrical wall circumjacent said seal; and said carrier further has a bight frictionally engaged with said cylindrical wall of said cup.

5. A fluid seal and speed sensor assembly according to claim 1, wherein said carrier has a cylindrical wall and a radial wall, said cup having a radial wall parallel with said encoder ring, and a cylindrical wall frictionally engaged with said cylindrical wall of said carrier, and further including a washer, interposed between said encoder ring and said radial wall of said carrier, cooperative with said radial wall of said cup for confining said ring therebetween.

6. A fluid seal and speed sensor assembly according to claim 1, wherein said cup further has a pair of spaced apart, radial walls, said radial walls confining said ring therebetween, and one of said radial walls having said seal joined thereto.

7. A fluid seal and speed sensor assembly according to claim 4, further including:

a seal joined to said radial wall of said cup.

* * * * *